March 31, 1970     J. G. METCALFE     3,504,256
MOTOR SPEED CONTROL CIRCUIT ARRANGEMENT
Filed April 24, 1967
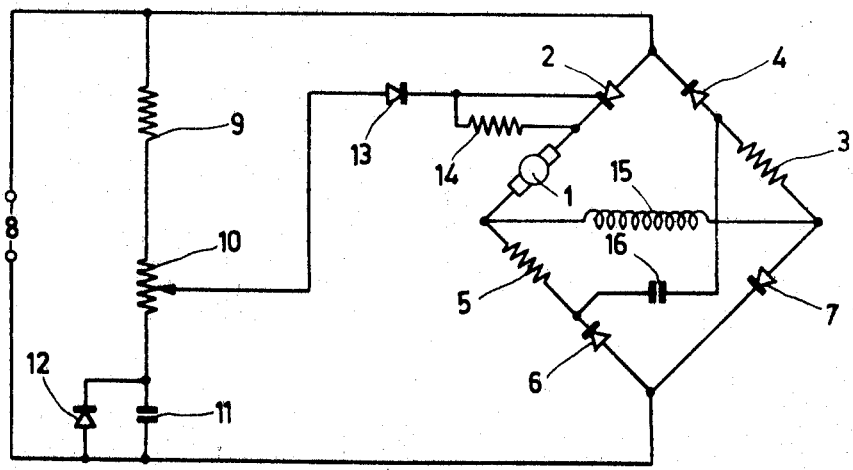
INVENTOR.
JOHN G. METCALFE
BY
AGENT 3,504,256
MOTOR SPEED CONTROL CIRCUIT
ARRANGEMENT
John Gilbert Metcalfe, Wallington, England, assignor to
U.S. Philips Corporation, New York, N.Y., a corporation of Delaware
Filed Apr. 24, 1967, Ser. No. 633,178
Claims priority, application Great Britain, June 14, 1966, 26,497/66
Int. Cl. H02p 7/00
U.S. Cl. 318—246                              6 Claims

ABSTRACT OF THE DISCLOSURE

An arrangement for controlling the speed of a motor in accordance with back E.M.F. generated by the motor armature providing a bridge circuit, one arm of which includes a controllable rectifier and the motor armature, and the other arms of which include further rectifiers. The motor field winding is connected across the diagonal of the bridge. The rectifiers are arranged such that current will always flow through the field winding in the same direction on both positive and negative cycles of applied voltage.

---

This invention relates to a circuit arrangement for controlling the speed of an electric motor such as an A.C. series commutator motor.

A circuit arrangement is known of the kind having the armature of the motor, its field winding and a controllable rectifier element connected in series, a control electrode of the said element being controlled by a regulating circuit and in dependence upon the amount of back E.M.F. in a feed-back circuit of the motor in which the controllable rectifier element is connected.

In a particular embodiment of a circuit arrangement of this kind the series connection of the controllable rectifier element, armature winding and field winding is connected across an A.C. supply in parallel with the regulating circuit comprising in series a fixed resistor, a potentiometer and a capacitor shunted by a diode. The regulating circuit effectively comprises a voltage divider and the tapping point of the potentiometer is connected through a diode to the control electrode of the controllable rectifier element. A resistor is usually connected between the cathode of this diode and the cathode of the controllable rectifier element. The tapping of the potentiometer adjusts the firing angle of the controllable rectifier element and hence the current supplied to the motor. When the motor is running and the controllable rectifier element is not conducting a small back E.M.F. proportional to the motor speed is generated across the armature due to the remnent field. This back E.M.F. provides a positive potential at the cathodes of the said element and the diode. At the start of the positive half cycle the potential across the capacitor is negligible, the capacitor having been discharged to the forward voltage of its shunting diode during the previous negative half cycle. Therefore the diode connected to the control electrode is reverse biased and the element is not fired. During the positive half cycle, the voltage on the anode side of this diode becomes increasingly positive until the diode becomes forward biased thus feeding current into the control electrode and firing the controllable rectifier element.

Feedback is effected because with a reducing motor speed on load the back E.M.F. is reduced and the diode becomes forward biased, and the element fires earlier in the cycle increasing motor power.

The amount of feedback is dependent on the remnent flux of the field which is generally small. Thus the improvement in torque-speed characteristic over a non-feedback arrangement is small.

Motor speed control is obtained by this kind of circuit but generally the speed stability with load variations is relatively poor since only a small amount of generated, or back, E.M.F. is received from the motor. If the speed stability of the motor is to be improved then this back E.M.F. must be increased and it is an object of the invention to provide an improvement to the circuit arrangement of the kind described by which this increase in back E.M.F. is achieved and the speed is rendered more stable with load variations than has hitherto been the case.

According to the present invention, a circuit arrangement for controlling the speed of an electric motor is provided. The arrangement includes a controllable rectifier element, the armature of the motor and its field winding connected in series, and a control electrode of the said element being controlled by a regulating circuit and in dependence upon the amount of back E.M.F. in a feed-back circuit of the motor in which the said element is connected. The controllable rectifier element and the armature of the motor are included as one arm of a bridge circuit, the other arms of which are comprised of rectifier elements, and the field winding is connected across a diagonal of the bridge circuit, the direction of conduction of the rectifying elements being such that, in operation, current flows through the field winding in the same direction on both positive and negative half cycles of an alternating current supplied to the bridge-circuit.

An example of the circuit arrangement in accordance with the invention will now be described with reference to the accompanying drawing.

Referring to the drawing, this shows a motor armature 1 connected in series with a controllable rectifier element 2, in this case a thyristor although it could be a valve, to form one arm of a bridge circuit, the second arm of the circuit is comprised of a series resistor 3 and a series connected diode 4. The third arm is comprised of a resistor 5 and a series connected diode 6, the fourth arm of a diode 7. The bridge is connected across an alternating current supply source 8. Also connected across this source 8 is a fixed resistor 9, a potentiometer 10 and a capacitor 11 shunted by a diode 12. The variable tapping point of the potentiometer 10 is connected to the gate electrode of the thyristor 2 through a diode 13, and a resistor 14 is connected between the cathodes of diode 13 and thyristor 2. The field winding 15 of the motor is connected across the diagonal of the bridge and a smoothing capacitor 16 is connected between the anode of diode 4 and the cathode of diode 6.

In operation the armature 1 rotates at a speed determined by the tapping point of the potentiometer 10 which supplies a reference voltage to the gate electrode of thyristor 2 via diode 13. When this voltage is larger than the generated or back E.M.F. of the armature 1 the thyristor is made to conduct and conducts for the rest of the half-cycle to speed up the motor. At the end of the half cycle the supply current reverses and the thyristor cuts off. Since normally no current would flow through the field winding 15 during this reverse half-cycle the amount of the back E.M.F. would be small. However, due to the bridge circuit, current will flow through the winding 15 on the reverse cycle via diodes 4, 6 and resistors 3 and 5 (which limit the value of this current and adjust the amount or degree of compounding) in the same direction as it flows during the forward half cycle when it flows through thyristor 2, armature 1 and diode 7. This increases the back E.M.F. produced and hence the sensitivity of the circuit since greater feedback is obtained. The motor is thus much more stable. In one practical example the back E.M.F. was found to have increased ten times. The capacitor 16 acts as a reservoir during the negative half cycles and thus produces a smoothing effect.

The tapping of potentiometer 10 is not necessarily variable if the motor is arranged to be run with the circuit arrangement as a single speed constant speed motor in which case the resistors 9 and 10 act as a voltage divider from which a fixed potential is tapped.

What is claimed is:

1. A circuit arrangement for controlling the speed of a motor in dependence upon the magnitude of back E.M.F. generated by said motor, said motor having an armature and a field winding, comprising, a bridge circuit including a controllable rectifier element having a control electrode, means applying an alternating current to said bridge, means connecting a regulating circuit to said control electrode for varying the speed of said motor, means connecting the armature of said motor between said rectifier element and said field winding, said element and said armature forming one arm of said bridge circuit, the other arms of which each include rectifying elements, means connecting said field winding across a diagonal of said bridge circuit, said rectifying elements being arranged such that the direction of conduction of said rectifying elements cause current to flow through said field winding in the same direction on both positive and negative half cycles of said alternating current supplied to the bridge circuit.

2. A circuit arrangement as claimed in claim 1, wherein the controllable rectifying element is a thyristor.

3. A circuit arrangement as claimed in claim 1 wherein the arms of the bridge through which current flows on the half cycles during which current does not flow through the controllable rectifier element include current limiting resistors.

4. A circuit arrangement as claimed in claim 1 wherein a capacitor is connected across the field winding.

5. A circuit arrangement for controlling the speed of a motor in dependence upon the magnitude of back E.M.F. generated by said motor, said motor having an armature winding and a field winding, comprising means for suppling an alternating electric current to said motor, bridge circuit means connected to said field winding for converting said alternating current into a unidirectional current in the field winding throughout each cycle of said alternating current, a controllable rectifier element having an input-output path and a control terminal, means for connecting said input-output path of said rectifier to said supply means, means including the input-output path of said rectifier for inhibiting the flow of current through said armature winding for at least one half cycle of said alternating electric current, whereby the back E.M.F. generated in the field winding is substantially unaffected by said armature winding during said inhibited half cycle, means for storing said back E.M.F. from said field winding, and means for applying said stored back E.M.F. to the control terminal of said controllable rectifier.

6. A circuit arrangement as claimed in claim 5, wherein said bridge circuit means comprises a diode bridge, and wherein said field winding of said motor is connected across said diode bridge.

References Cited

UNITED STATES PATENTS

| | | | |
|---|---|---|---|
| 3,127,550 | 3/1964 | Gilbreath et al. | 318—331 |
| 3,302,088 | 1/1967 | Wigington | 318—246 |

ORIS L. RADER, Primary Examiner

K. L. CROSSON, Assistant Examiner

U.S. Cl. X.R.

318—331